(No Model.)
J. B. PORTER.
CAR HEATING APPARATUS.
No. 402,541. Patented Apr. 30, 1889.
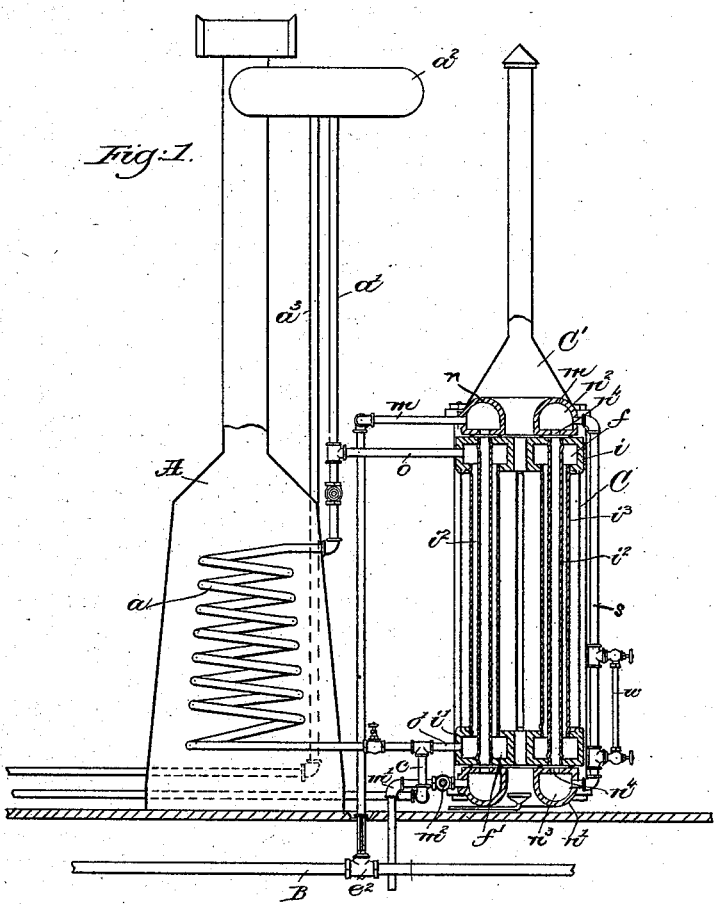
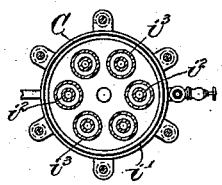
Witnesses.
Fred. L. Greenleaf
Frederick L. Emery.
Inventor.
John B. Porter.
By Leroy Gregory
Atty.

UNITED STATES PATENT OFFICE.

JOHN B. PORTER, OF NEW YORK, N. Y., ASSIGNOR TO THE SEWALL SAFETY HEATING COMPANY, OF PORTLAND, MAINE.

CAR-HEATING APPARATUS.

SPECIFICATION forming part of Letters Patent No. 402,541, dated April 30, 1889.

Application filed April 21, 1888. Serial No. 271,421. (No model.)

*To all whom it may concern:*

Be it known that I, JOHN B. PORTER, of New York, county and State of New York, have invented an Improvement in Car-Heating Apparatus, of which the following description, in connection with the accompanying drawings, is a specification, like letters on the drawings representing like parts.

This invention has for its object to improve the construction of car-heating apparatus; and it consists in various details of construction, to be hereinafter pointed out.

In accordance with this invention a heater comprising steam and water chambers is employed, the steam-chambers being filled with steam taken from the main steam-pipe, located beneath the car, and the water-chambers being in operative contact with the warming or circulation pipes. An auxiliary heater, preferably what is commonly known as the "Baker" or "Johnson" heater, may be employed, the heating coil or reservoir of such heater also being in operative contact with the system of warming-pipes.

Figure 1 shows in vertical section and partial elevation a car-heating apparatus embodying this invention; Fig. 2, a top view of the main heater, to be described.

The auxiliary heater A, containing the heating-coil $a$, is of any suitable or well-known construction, the upper end of said coil being connected with the reservoir or expansion-chamber $a^2$ by the pipe $a'$. A pipe, $a^3$, leads from the said reservoir and connects with the system of warming-pipes extended through the car. The lower end of the coil $a$ is also connected to the warming-pipes by the pipe $c$.

The main heater consists of two like boxes or heads, $i$ $i'$, each of which is cored out to form within a large chamber. The box $i$ has upon each side a series of openings, herein shown as six in number, the openings upon the upper side corresponding as to position with those upon the under side, but being made somewhat smaller than the openings upon the under side, and the box or chamber $i'$ has corresponding openings arranged reversely—that is to say, the smaller openings being upon the under side. Several tubes, as $i^2$, are placed within tubes $i^3$, and are connected at each end with the boxes or heads $i$ $i'$, the smaller or inner tubes, $i^2$, passing through the larger openings in the boxes and being secured to the boxes at or within the smaller openings, while the larger tubes, $i^3$, are secured to the boxes at or within the larger openings. Two other boxes or heads, $n$ $n'$, suitably cored out or formed to present within annular chambers, as $n^2$ $n^3$, are secured to the heads $i$ $i'$, the chambers within communicating by a series of openings, as $n^4$, with the smaller or inner pipes. A pipe, $m$, leads from the chamber $n^2$ of the head $n$ to the main steam-pipe B beneath the car, and when the three-way cock $e^2$ or other controlling-valve in said main steam-pipe is open the chamber $n^2$ of the head $n$ will be filled with steam, which also fills the pipes $i^2$ and the chamber $n^3$ of the head $n'$. A pipe, $m'$, leads from the chamber $n^3$ of the head $n'$, which pipe serves as an escape-pipe for the water of condensation, such escape being controlled by a cock, $m^2$, placed in said pipe. A pipe, $o$, leads from the chamber $f$ of the head $i$, which pipe communicates with the pipe $a'$, and a pipe, $o'$, leads from the chamber $f'$ of the head $i'$, which communicates with the system of warming-pipes. The water contained in the reservoir $a^2$ fills the chambers $f$ $f'$ and the annular space formed between the tubes $i^2$ $i^3$.

It will be observed that as the steam is admitted to the chamber $n^2$ and the inner pipes, $i^2$, the water contained in the water-space between the pipes $i^2$ $i^3$ will be heated to start and thereafter maintain a continuous circulation.

A pipe, $s$, connects the steam-chambers $n^2$ $n^3$, and a water-gage, $w$, is attached to said pipe to determine the height or quantity of water of condensation contained in the steam-chambers.

By the heater herein described a large quantity of water equally distributed over a large surface will be presented in a very small space to a large steam-heating surface.

The several heating-pipes may be inclosed in a drum or casing, C, beneath a suitable dome or top, C', having a flue, so that the said pipes may be heated by a flame, if desired.

I claim—

1. In a car-heating apparatus, the combination, with the main steam-pipe and a system of warming-pipes, of several vertical water-reservoirs connected to each other at their ends by the chambered heads $i\ i'$, and in communication thereby with the warming-pipes, that the water may circulate freely therethrough, and several steam-reservoirs, $i^2$, passing entirely through said chambered heads, in communication with the main steam-pipe and with each other by the chambers $n^2\ n^3$ and extended through the said water-reservoirs and surrounded throughout their length by the water contained therein, substantially as described.

2. In a car-heating apparatus, the main steam-pipe and warming-pipes, combined with the water-chambers $f f'$, connected by two or more pipes, $i^3$, attached to the under and upper side, respectively, of the said chambers, and the steam-chambers $n^2\ n^3$, secured and adjacent to said chambers $f f'$, respectively, and connected by two or more pipes, $i^2$, arranged within, parallel and concentric with relation to the water-pipes and passing completely through, but not communicating with, said water-chambers, substantially as described.

3. In a car-heating apparatus, the heater herein described, comprising the chambered heads $i\ i'$, joined by the pipes $i^3$, attached to the under and upper sides, respectively, of the said heads, and the chambered heads $n\ n'$, joined by the pipes $i^2$, which pass through the chambered heads $i\ i'$ and concentrically through the pipes $i^3$, substantially as described.

4. In a car-heating apparatus, the heater comprising several vertical water-reservoirs, $i^3$, completely inclosed in a drum or casing, C, open at its ends and adapted to be heated externally by a flame in said drum, combined with the warming-pipes attached to said reservoirs at the end thereof, substantially as described.

In testimony whereof I have signed my name to this specification in the presence of two subscribing witnesses.

JOHN B. PORTER.

Witnesses:
BERNICE J. NOYES,
F. L. EMERY.